United States Patent [19]

Harasaki et al.

[11] 4,366,598
[45] Jan. 4, 1983

[54] HINGE STRUCTURE

[75] Inventors: Hayathugu Harasaki; Nobuaki Matsuura, both of Hiroshima, Japan

[73] Assignee: Toyo Kogyo Co., Ltd., Hiroshima, Japan

[21] Appl. No.: 125,235

[22] Filed: Feb. 27, 1980

[30] Foreign Application Priority Data

Feb. 27, 1979 [JP] Japan .............................. 54-24943[U]

[51] Int. Cl.³ ............................................... E05D 5/02
[52] U.S. Cl. ......................................... 16/382; 16/390; 180/69 C
[58] Field of Search ................... 16/128.1, 135, 157, 16/355, 362, 372, 387, 388, 389, 390, 392, 382; 180/69 C

[56]  References Cited

U.S. PATENT DOCUMENTS

| | | | |
|---|---|---|---|
| 1,636,007 | 7/1927 | Marshall | 16/135 |
| 2,200,251 | 5/1940 | Atwood | 16/135 X |
| 2,284,320 | 5/1942 | Howe | 16/135 |
| 2,688,764 | 9/1954 | Squire | 16/135 X |

FOREIGN PATENT DOCUMENTS

| | | | |
|---|---|---|---|
| G 14078 | 10/1956 | Fed. Rep. of Germany | 16/128.1 |
| 2651410 | 5/1978 | Fed. Rep. of Germany | 16/389 |

*Primary Examiner*—Wm. Carter Reynolds
*Attorney, Agent, or Firm*—Wenderoth, Lind & Ponack

[57] ABSTRACT

A hinge structure for pivotally connecting a hood or bonnet of an automobile to the automobile for selectively opening and closing an automobile engine compartment of a front body structure of the automobile including a first hinge bracket having one end portion rigidly secured to a stiffening plate which is in turn secured to the hood, and a second hinge bracket having one end portion rigidly secured to a radiator shroud which is in turn secured to the front body structure. The other end portions of the respective first and second hinge brackets are pivotally connected by means of a hinge pin. Each of the first and second hinge brackets is of generally a U-shaped cross-section.

9 Claims, 5 Drawing Figures

HINGE STRUCTURE

BACKGROUND OF THE INVENTION

The present invention generally relates to a hinge structure and, more particularly, to a hinge structure for use in an automobile body structure for the hinged support of an engine compartment hood, a trunk lid or the like relative to the body structure.

Of numerous types of hinge structures currently available, the hinge structure of a construction shown in FIG. 1 of the accompanying drawings is considered most pertinent to the present invention. As shown in FIG. 1, the prior art hinge structure considered pertinent to the present invention comprises first and second hinge brackets 1 and 2 connected together by means of a hinge pin 3 for pivotal movement relative to each other. The first hinge bracket 1 has a fillet 1a protruding laterally threrefrom and lying in a plane substantially parallel to the axis of the hinge pin 3, said first hinge bracket 1 being secured to a stiffener plate 4 through the fillet 1a by the use of a plurality of, for example, two, bolts and nuts 5. With the first hinge bracket 1 so secured to the stiffener plate 4, the latter is backed by a backing plate 6 positioned on one side of the stiffening plate 4 opposite to the fillet 1a and held in position by the bolts and nuts 5 for improving the rigidity of the stiffening plate 4. The stiffening plate 4 carrying the first hinge bracket 1 has a flanged portion 4a welded to a front end portion 7a of an automobile engine compartment hood or bonnet 7 while that front end portion 7a is at the same time crimped to hold that flanged portion 4a of the stiffening plate 4.

On the other hand, the second hinge bracket 2 has a mounting fillet 2a protruding laterally therefrom and lying in a plane substantially parallel to the axis of the hinge pin 3, said second hinge bracket 2 being rigidly mounted on a flange 8a, which is rigidly secured to a radiator shroud 8, through the fillet 2a by the use of one or more bolts and nuts 9. The radiator shroud 8, thus carrying the second hinge bracket 2, is in turn secured to a partition wall 10a, which is rigidly secured to an automobile front body structure 10.

According to the prior art hinge structure, it is a general practice to connect the hood 7 hingedly to the mounting flange 8a by connecting the first hinge bracket 1, to the stiffening plate 4 and to the second hinge bracket 2 through the hinge pin 3, and then by connecting the second hinge bracket 2 to the mounting flange 8a.

The prior art hinge structure of the illustrated construction involves numerous disadvantages and inconveniences. By way of example, when the hood 7 is repeatedly opened and closed about the hinge pin 3, a load tends to act on localized areas of the hinge structure to such an extent as to cause the stiffening plate 4 and/or the radiator shroud 8 to be undesirably deformed. Once this deformation takes place, the hood 7 will no longer pivot in the original manner. In other words, even though the backing plate 6 is employed to reinforce the stiffening plate 4, it does not provide a sufficient resistance to prevent a bending or deformation of plate 4 and/or the shroud 8.

Moreover, the prior art hinge structure require the employment of the bolts and nuts in connecting the first and second hinge brackets to the hood and the radiator shroud, respectively. These bolts and nuts are generally exposed to the atmosphere and are thus apt to rust. In general, the rusty bolts and nuts may subsequently cause the rusting of the hood and/or the radiator shroud. In addition, the employment of the bolts and nuts requires a complicated and time-consuming operation to connect the first and second hinge brackets to the hood and the radiator shroud, respectively.

SUMMARY OF THE INVENTION

Accordingly, an object of the present invention is to substantially eliminate the above described disadvantages and inconveniences inherent in the prior art hinge structure and is intended to provide an improved hinge structure which is rigid in structure, has a sufficient resistance to bending and does not require the additional empolyment of any other reinforcement member.

Another object of the present invention is to provide an improved hinge structure of the type described above which does not employ any fastening members and, therefore, does not involve any complicated and time-consuming operation in connecting the hinge structure to the hood and the radiator shroud.

A further object of the present invention is to provide an improved hinge structure which comprises first and second hinge brackets so designed as to be pivotally connected together after the first and second hinge brackets have been secured respectively to the hood and the radiator shroud.

A still further object of the present invention is to provide an improved hinge structure which can readily be manufactured without a substantial increase in manufacturing cost as compared to prior art hinge structures.

BRIEF DESCRIPTION OF THE DRAWINGS

These and other objects and features of the present invention will readily become apparent from the following description taken in conjunction with a preferred embodiment thereof with reference to the accompanying drawings, in which.

DETAILED DESCRIPTION OF THE INVENTION

Figure 1:
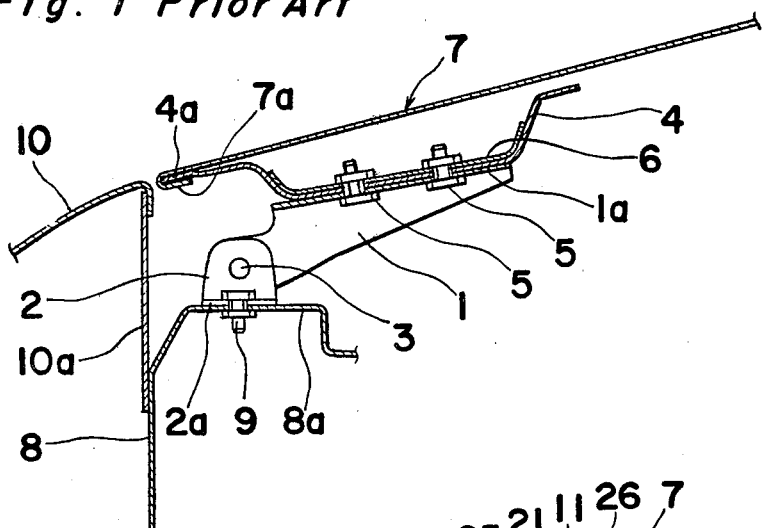
FIG. 1 is a side sectional view of the prior art hinge structure as applied in connecting the hood to the automobile radiator shroud.

Before the description of the present invention proceeds, it is to be noted that like parts are designated by like reference numerals throughout the accompanying drawings. It is also to be noted that, although the hinge structure of the present invention has numerous applications wherever a hinged connection is required, the present invention will be described as applied to hingedly connect the hood for selectively opening and closing a hood of an automobile engine compartment of an automobile front body structure.

Referring to FIGS. 2 to 5, the hinge structure of the present invention comprises substantially elongated first and second hinge brackets 11 and 12 hingedly connected together by means of a hinge pin 13. As will be described later, the operation of hingedly connecting these first and second hinge brackets 11 and 12 by the use of the hinge pin 13 is performed after the first and second hinge brackets 11 and 12 have been secured to a hood 7 and an automobile front body structure, particularly the radiator shroud 8, respectively.

Figure 2:
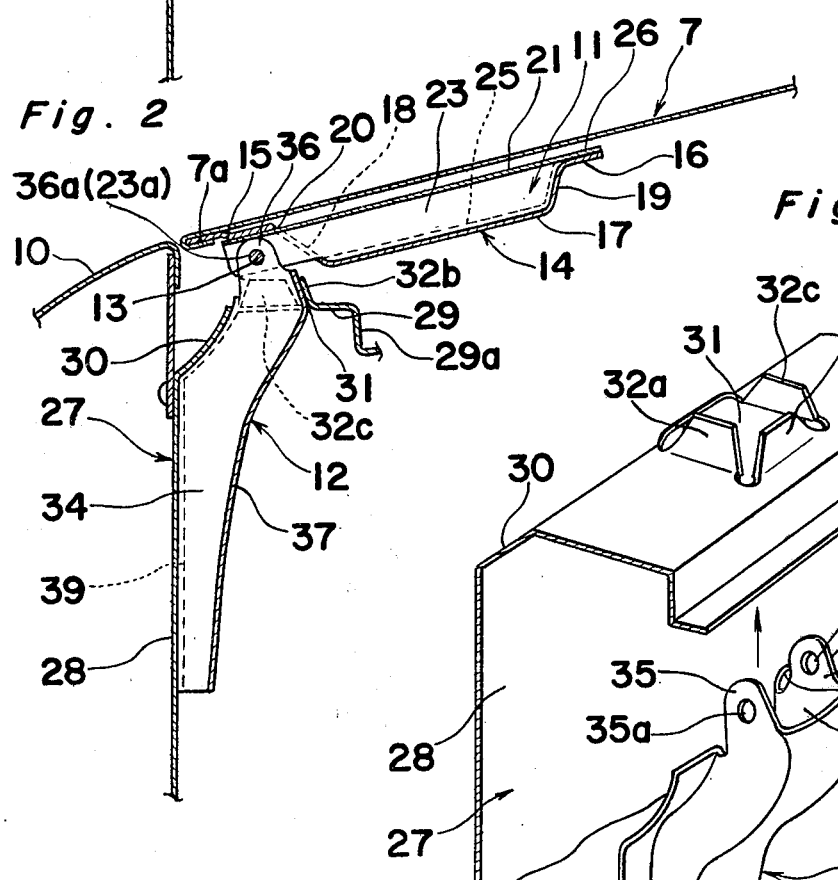
FIG. 2 is a side sectional view of a hinge structure embodying the present invention and as applied to an automobile in a manner similar to that of the prior art hinge structure.
Figure 4:
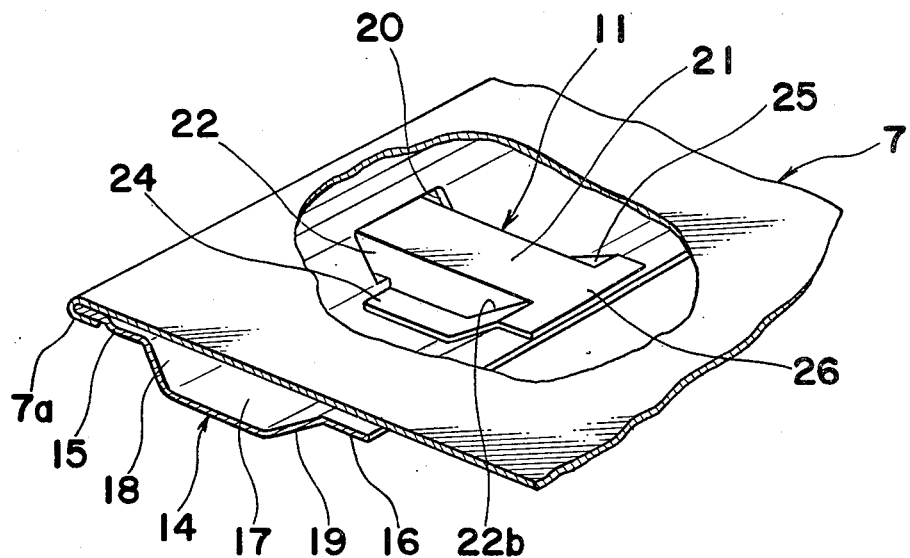
FIG. 4 is a partially cutaway perspective view of one of the hinge brackets of the hinge structure shown in FIG. 2.

As best shown in FIGS. 2 and 4, the first hinge bracket 11 is secured to the hood 7 through a substantially elongated stiffening plate 14. This stiffening plate 14 has end portions being respectively depressed to define a pair of opposed flanges 15 and 16, an intermediate bottom area 17 and a pair of opposed slanted or inclined walls 18 and 19, said slanted walls 18 and 19 extending outwardly from the bottom area 17 so as to extend away from each other and the outer ends thereof from or are connected to the opposed flanges 15 and 16 respectively. The plate 14 may be, or may be used as, a stiffening plate such as shown by 4 and generally fitted to the engine compartment hood 7 in the manner as shown in FIG. 1. However, in accordance with the present invention, the stiffening plate 14 has a square or preferably rectangular opening 20 through one of the slanted walls, the slant wall 18 of the preferred embodiment, which faces the second hinge bracket 12 when the plate 14 is fitted to the hood 7 with the free end adjacent flange 15 welded to and crimped by the front end portion of the hood 7 as shown in FIGS. 1 and 2.

Figure 5:
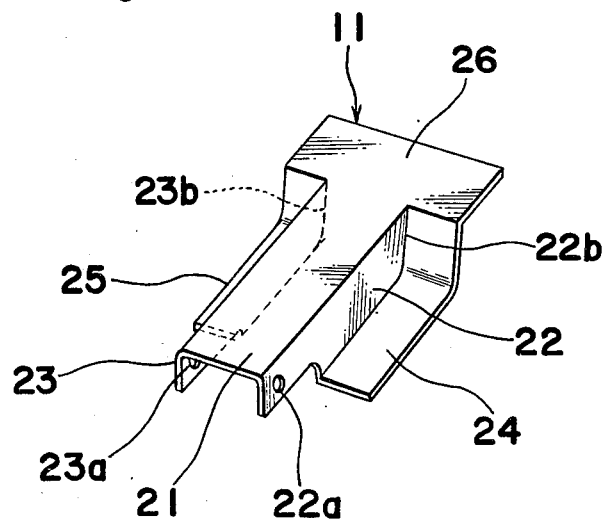
FIG. 5 is a perspective view of the hinge bracket shown in FIG. 4.

The first hinge bracket 11 is carried by the stiffening plate 14 with one end portion of the bracket 11 protruding outwardly through the opening 20 and an opposite end portion thereof rigidly mounted on the stiffening plate 14 in a manner as will be described later. As best shown in FIG. 5, the first hinge bracket 11 is of generally U-shaped cross section having a flat top wall 21 and a pair of opposed side walls 22 and 23 downwardly extending from the respective side edges of the flat top area 21 in a direction at right angles thereto, and having free edges along the bottoms thereof. Each of the side walls 22 and 23 has at the first end a bearing hole 22a or 23a and the other or second end is upwardly inclined at 22b or 23b at an angle equal to the angle between the bottom area 17 and the slanted wall 19 of the stiffening plate 14 for a purpose which will become clear from the subsequent description. The hinge bracket 11 also has a pair of elongated first fillets 24 and 25, each protruding laterally outwardly from the respective side walls 22 and 23, and each of said fillets 24 and 25 being integrally connected with the free side edge and inclined end 22b or 23b of the corresponding side wall 22 or 23. Thus, the fillets 24 and 25 have surfaces which follow the contour of the free side edge and inclined end 22b or 23b of the corresponding side wall 22 or 23. The hinge bracket 11 further has an elongated toe 26 lying in the same plane as the flat top area 21, and the toe 26 has one side edge integrally connected with one end of the flat top area 21 and with ends of the respective fillets 24 and 25. It is to be noted that the hinge bracket 11 is a one-piece integral structure and can be formed from a metal strip by the use of any known press work.

As best shown in FIGS. 2 and 4, the first hinge bracket 11 of the construction described above is carried by the stiffening plate 14 with the fillets 24 and 25 welded by the use of any known spot welding technique to the bottom area 17 and the slanted wall 19, and also the toe 26 is similarly welded to the flange 16 while the end portion of the hinge bracket 11 adjacent the bearing holes 22a and 23a protruding outwardly through the opening 20. It will readily be seen that, after the first hinge bracket 11 has been so mounted on the fitting plate 14 as hereinbefore described, a generally rectangular cross-sectioned space is defined by the U-shaped bracket and the top surface of the stiffening plate 14. The opening 20 has a dimension in the direction between side walls 22 and 23 which is less than the distance between the free outer edges of fillets 24 and 25.

Figure 3:
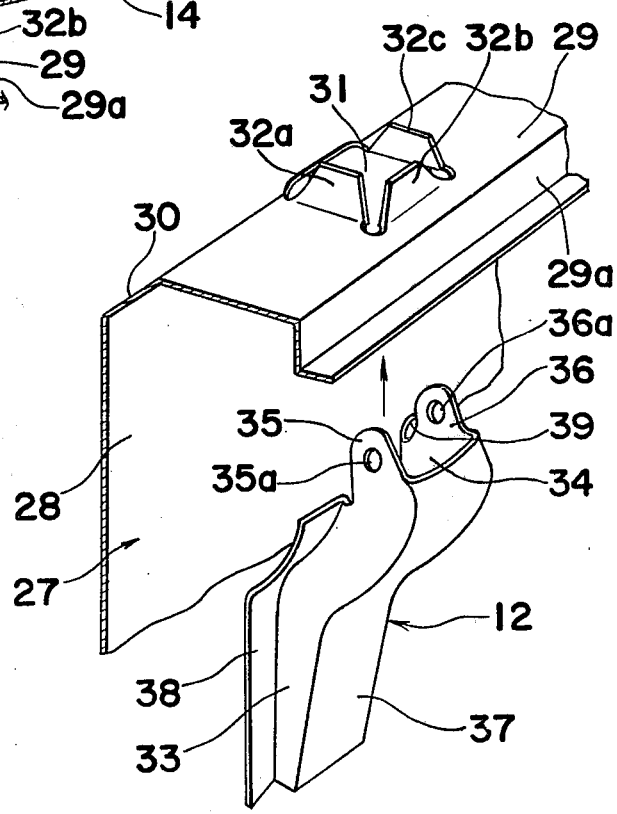
FIG. 3 is an enlarged perspective view of one of two hinge brackets of the hinge structure shown in FIG. 2.

As best shown in FIG. 3, the second hinge bracket 12 is secured to a front body structure 10, specifically to a partition wall 10a, through a substantially elongated support plate 27. The support plate 27 has an upright or vertical area 28, an overhang area 29, lying in a plane generally at right angles to the upright area 28, and an inclined connecting plate 30 extending between the upright area 28 and the overhang area 29 with its opposite side edges being integral with the respective side edges of the areas 28 and 29. The free side edge of the overhang area 29 remote from the connecting plate 30 is bent at 29a to extend downwardly therefrom in a direction parallel to the upright area 28 for the purpose of reinforcing the overhang area 29.

This support plate 27 may be a radiator shroud, like 8 of FIG. 1, and may be generally fitted to the partition wall 10a in the manner as also shown in FIG. 1. However, in accordance with the present invention, the support plate 27 has a substantially square or preferably rectangular, opening 31 provided in the overhang portion 29 together. Three fillets or flanges 32a, 32b and 32c extend upwardly from the peripheral edges of the opening 31.

The second hinge bracket 12 is attached to the front body structure 10 with one end portion thereof protruding upwardly through the opening 31 and the other end portion thereof secured to the upright portion 28 of the support plate 27 which is secured to the partition wall 10a in a manner known to those skilled in the art. This hinge bracket 12 is of generally U-shaped cross section and has a pair of opposed side walls 33 and 34, each having respective bearing lugs 35 and 36 and each connected a back plate 37. The side walls 33 and 34 and preferably the bearing lugs 35 and 36 respectively have a distance between them that is equal to or slightly smaller than the inner span between the two respective inner edges of the side walls 22 and 23 of the first hinge bracket 11 for the reason which will become clear from the subsequent description. The bearing lugs 35 and 36 have respective bearing holes 35a and 36a defined therein which are in alignment with each other.

In order to secure the hinge bracket 12 to the support plate 27, each of the side walls 33 and 34 has a fillet 38 or 39 integral with and protruding laterally from the free side edge of the corresponding side wall 33 or 34. The hinge bracket 12 is shaped so as to follow the contour formed by the upright 28, connecting plate 30 and overhang area 29 of the support plate 27, and each of the components 33, 34, 37, 38 and 39 of the hinge bracket 12 is also shaped to complement the surface of the support plate 27. However, it is preferred that, as shown, the width of each of the side walls 33 and 34 continuously increase from the ends opposite the lugs 35 and 36 to the ends adjacent the lugs 35 and 36 with the maximum width being at the ends of the corresponding side wall 33 or 34 adjacent the bearing lug 35 or 36 and the minimum width being at the ends of the corresponding side wall most remote from the associated bearing lugs.

The second hinge bracket 12 of the construction described hereinbefore is carried by the support plate 27 with the fillets 38 and 39 welded, by any known spot welding technique to, the upright area 28 and the connecting plate 30 of the support plate 27, and also the fillets or flanges 32a, 32b and 32c are similarly welded to the side wall 33, the back plate 37 and the side wall 34, respectively.

From the foregoing description of the present invention, it will readily be seen that, after the first and second hinge brackets 11 and 12 have been secured to the hood 7 and the front body structure 10 in the respective manners as hereinbefore described, insertion of the hinge pin 13 through the bearing holes 22a, 35a, 36a and 23a is performed so as to connect the first and second hinge brackets 11 and 12 pivotally with each other, thereby assembling the hinge structure of the present invention.

From the foregoing description, it has now become clear that the hinge structure according to the present invention involves numerous advantages. For example, since no fastening elements such as bolts and nuts or rivets are required as compared to the prior art hinge structure, there is no substantial possibility that the hood 7 and the front body structure 10 will rust due to the rusting of the aforementioned fastening elements. This is particularly true where the first and second hinge brackets 11 and 12 are pivotally connected together by the use of the hinge pin 13 after they have been secured respectively to the hood 7 and the front body structure 10, and the assembly of the hood including the first hinge structure 11 and the assembly of the front body structure 10 including the second hinge structure have subsequently been painted separately or simultaneously.

In addition, once the first and second hinge brackets 11 and 12 have been secured respectively to the hood 7 and the front body structure 10, the only remaining assembly operation is to insert the hinge pin 13 through the bearing holes to complete the hinged connection. This means that the hinge structure according to the present invention does not require a complicated assembly operation involving a time-consuming procedure as has heretofore required in connecting hinge brackets together in the prior art hinge structure.

Furthermore, since each of the first and second hinge brackets 11 and 12 is of generally a U-shaped cross section, the hinge structure of the present invention has a better resistance to bending and a greater physical strength than the prior art hinge structure. This advantage can readily be understood from the generally recognized fact that, for a given material, a channel-sectioned member has a greater resistance to bending than a flat bar member.

In practice, although only one hinge structure has been referred to in the foregoing description, two or more hinge structures of identical construction may be employed.

Although the present invention has fully been described in connection with the preferred embodiment thereof with reference to the accompanying drawings, it is to be noted that various changes and modifications are apparent to those skilled in the art. By way of example, in securing the first hinge bracket 11 to the stiffening plate 14, the first hinge bracket 11 may be mounted on the stiffening plate 14 with the flat top area 21 welded thereto. In this case, the fillets 24 and 25 and the toe 26 may not be always necessary. In like manner, the second hinge bracket 12 may be secured to the support plate 27 with the back plate 37 welded to the upright area 28. In addition, the bearing lugs 35 and 36 may be spaced a distance equal to or slightly larger than the outer span between the two respective outer edges of the side walls 22 and 23 of the first hinge bracket 11.

Such changes and modifications are to be understood to be within the true scope and spirit of the present invention unless they clearly depart therefrom.

We claim:

1. A hinge structure for pivotally connecting a hood to an automobile comprising:

a stiffening plate having first and second portions connected to each other and positioned at an angle with respect to each other, the first stiffening plate portion having an opening therein, said stiffening plate being adapted to be secured to an automobile hood at an area adjacent a free end of the first stiffening plate portion, the second stiffening plate portion being spaced from the hood and having an inner surface facing the hood when said stiffening plate is secured to the hood;

a substantially U-shaped first hinge bracket having a top wall and two spaced first side walls connected to the respective sides of said top wall and having a free longitudinal edge, said first hinge bracket having first and second ends, the first end projecting through said opening and the second end being between said inner surface and the hood when said stiffening plate is secured to the hood;

two first fillets respectively attached to a corresponding one of the free longitudinal edges in said first hinge bracket and extending from the respective side wall of said first hinge bracket at an angle thereto, the second end of said first hinge bracket being connected to said inner surface at said first fillets, whereby an interior space is formed by said first hinge bracket and said inner surface;

said first side walls respectively having two first bearing holes therethrough at the first ends;

a radiator shroud having first and second portions which extend at angle with respect to one another, the second portion having an aperture therethrough;

an elongated second hinge bracket secured to said first shroud portion and having an end projecting through said aperture, said end of said second hinge bracket having second bearing holes therethrough;

flanges connected to the second shroud portion along the peripheral edge of the aperture and to said second hinge bracket for fixing said second hinge relative to the second shroud portion; and a hinge pin extending through said bearing holes for pivotally connecting the hinge brackets.

2. A hinge structure as claimed in claim 1 in which said opening in the first portion of said stiffening plate has a dimension in the direction between said spaced first side walls less than the distance between the free outer edges of said first fillets.

3. A hinge structure as claimed in claim 1, wherein said second hinge bracket has an elongated back plate and two spaced second side walls, each of said second side walls being connected along one longitudinal edge to said elongated back plate and having a free longitudinal edge, said hinge bracket having a substantially U-shaped lateral cross-section, each of said second side walls has a bearing lug projecting therefrom, said second bearing holes being in the respective bearing lugs.

4. A hinge structure as claimed in claim 2, wherein said second hinge bracket further has two second fillets attached to the free longitudinal edges of the respective second side walls and extending from the respective second side walls at an angle with respect thereto, said second hinge bracket being attached to the first shroud portion at said second fillets.

5. A hinge structure as claimed in claim 1, wherein said first hinge bracket is an integral structure.

6. A hinge structure as claimed in claim 1, wherein said second hinge bracket is an integral structure.

7. A hinge structure comprising:
 a stiffening plate having first and second portions and a flange, said flange being connected to the first portion and being adapted to be secured to an automobile hood, the second portion being connected to the first portion and, when said stiffening plate is secured to the hood, being spaced from the hood and having an inner surface facing the hood, said first and second portions extending at an angle with respect to one another, one of said portions having an opening therethrough;
 an integral substantially U-shaped first hinge bracket having a top wall and two spaced first sidewalls, each of said first sidewalls having a first edge along said top wall and a free edge, said first hinge bracket having first and second ends, the first end projecting through said opening, said first sidewalls at the first end portion respectively having first bearing holes therethrough;
 two connecting portions attached to corresponding free edges of said first sidewalls, said first hinge bracket being connected to said inner surface at said connecting portions, whereby an interior space is formed by said top wall, said first side walls and said inner surface;
 a body structure having first and second body structure portions, the second body structure portion extending at an angle with respect to said first body structure portion and having an aperture therethrough, and flanges extending from the second body structure portion along the peripheral edges of said aperture;
 a second hinge bracket rigidly secured to the first body structure portion and having a substantially U-shaped lateral cross-section including two spaced second sidewalls, said second hinge bracket extending through said aperture and said sidewalls having second bearing holes therethrough and said flanges being connected to said second hinge bracket; and
 a hinge pin extending through said bearing holes for pivotally connecting the hinge brackets.

8. A hinge structure as claimed in claim 7, wherein said connecting portions are welded to said inner surface and said second hinge bracket is welded to the first body structure portion.

9. A hinge structure as claimed in claim 7, wherein said stiffening plate is an integral structure.

* * * * *